Jan. 22, 1957

F. R. PERRY

POWER UNIT FOR SUPPORTING INTERCHANGEABLE
POWER OPERATED TOOLS 2,778,233

Filed July 6, 1954

INVENTOR
FRANK R. PERRY
BY
*Mason & Graham*

ATTORNEYS

Jan. 22, 1957
F. R. PERRY
2,778,233
POWER UNIT FOR SUPPORTING INTERCHANGEABLE
POWER OPERATED TOOLS
Filed July 6, 1954
2 Sheets-Sheet 2
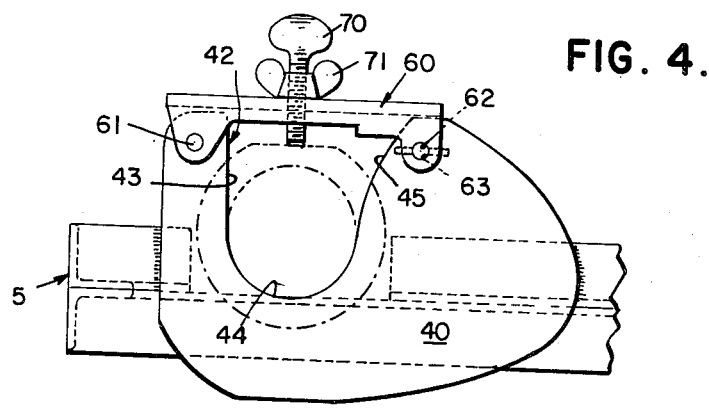
FIG. 4.
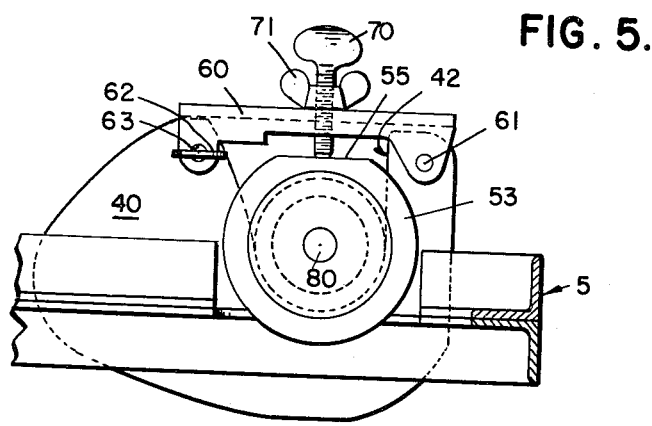
FIG. 5.
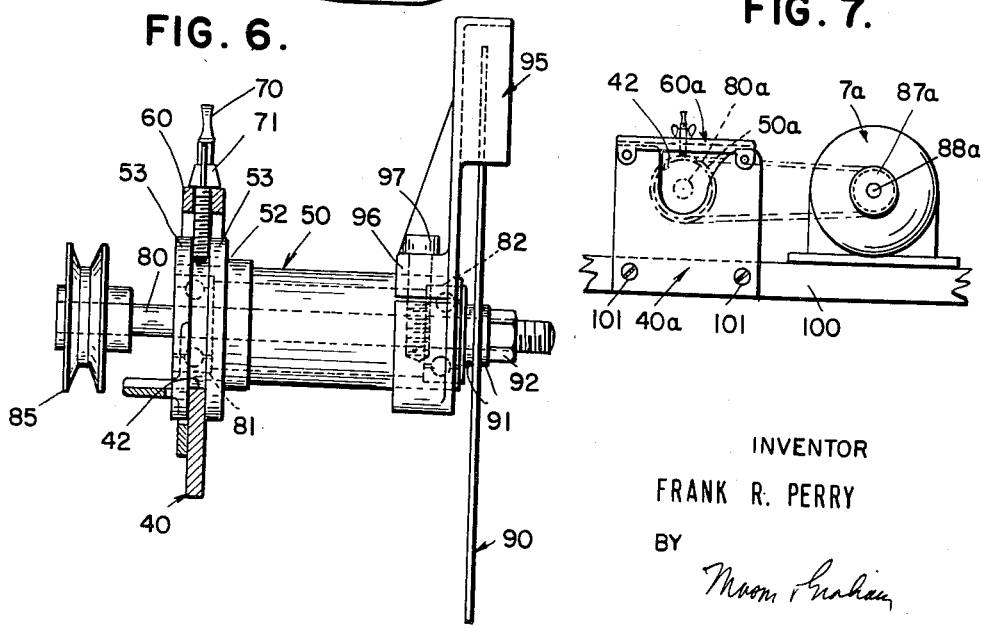
FIG. 6.
FIG. 7.
INVENTOR
FRANK R. PERRY
BY
Mason Graham
ATTORNEYS

United States Patent Office 2,778,233
Patented Jan. 22, 1957

2,778,233
POWER UNIT FOR SUPPORTING INTERCHANGEABLE POWER OPERATED TOOLS

Frank R. Perry, Los Angeles, Calif., assignor to Turco Products, Inc., a corporation of California Application July 6, 1954, Serial No. 441,423

2 Claims. (Cl. 74—219)

My invention has to do with power units and relates more particularly to a power unit adapted for operatively supporting interchangeable power driven tools in a manner to render the tools quickly and easily changed.

A purpose of my invention is to provide a unit of this character which is peculiarly useful around a home for operating various interchangeable tools such as lawn mowing tools, edgers, grinders, as well as various other power driven tools.

It is another object of my invention to provide a portable power unit of economical construction which is so designed that various power driven tools may be interchangeably used upon it and may be quickly and easily mounted on and demounted from the unit.

A further object is to provide a unit of this character which incorporates novel means for adjusting the height of the tool supporting member.

Other objects and advantages will appear hereinafter.

For the purpose of rendering my invention clearly understood, I shall now describe a presently preferred embodiment thereof, although this description is intended only for explanatory purposes and is not to be taken as limitative upon the broader aspects of my invention, except as may appear from the appended claims. For the purpose of the ensuing description, I shall refer to the accompanying drawings wherein:

Fig. 4 is an enlarged fragmentary elevation taken on line 4—4 of Fig. 1;

Fig. 5 is an enlarged fragmentary elevation taken on line 5—5 of Fig. 1;

Fig. 6 is an enlarged section taken on line 6—6 of Fig. 1; and

Fig. 7 is a side elevation of a modified form of my unit.

Figure 1:
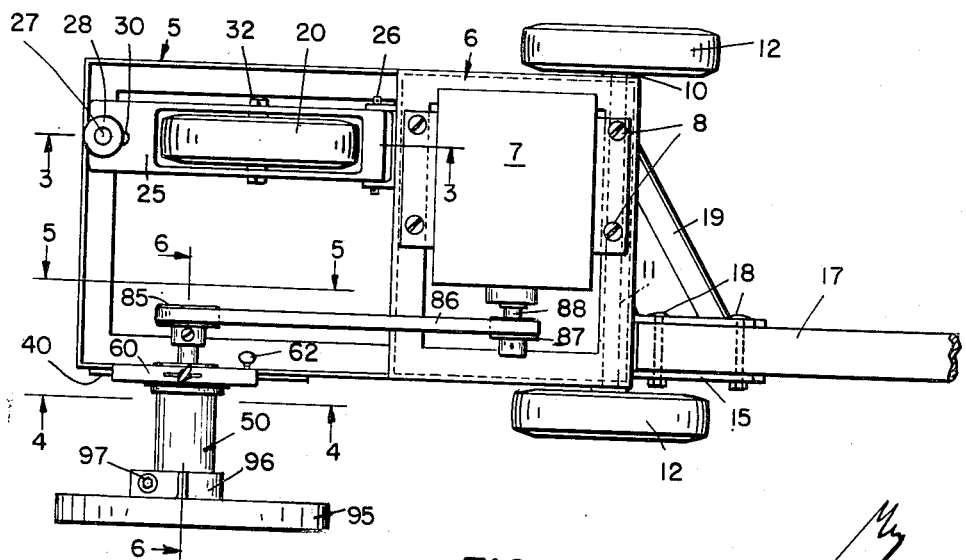
Fig. 1 is a top plan view of a portable power unit incorporating my invention.

Referring now to the drawings, 5 denotes a rectangular T-iron frame upon one portion of which I secure, as by welding, a motor mounting frame 6. A power element 7, which is here shown as an internal combustion engine but which may be an electric motor, is bolted to the mounting frame by bolts 8.

A rear axle housing 10 is fixedly secured to the frame 5, as by welding, and in this housing is journalled an axle 11, on the outer ends of which I secure wheels 12.

A bifurcated bracket 15 is secured to the rear end of the frames 5 and 6 for the reception of a handle 17 for manually manipulating the portable unit, the handle being secured to the bracket as by bolts 18. Inasmuch as the motor is preferably mounted on the frame 6 adjacent one side edge thereof and the power driven tool elements, to be described, are mounted on the opposite side of the frame 5, I obtain a better balancing effect by placing the bracket 15 adjacent the side of the frame opposite the motor. A stiffening angle iron brace 19 is secured at its respective ends to the frame 5 and to bracket 15, as by welding.

For vertically adjustably supporting the frame 5 I provide a third wheel 20 supported as follows: an arm 25 is pivoted to the frame at its rear or right hand end by a pin 26. A threaded post 27 is fixed to the frame 5 as by having its bottom end threaded into the frame. A nut 28 having spaced annular flanges 29 is threaded onto the post, the outer or left hand end of the arm 25 presenting a longitudinal slot 30 to pass the post, and the nut flanges engage opposite surfaces of the arm 25 about the slot, so that, by rotating the nut relative to the post, the axle 32 upon which the wheel 20 is mounted, is adjustable upwardly or downwardly to raise or lower the left end of the frame 5 with reference to the ground. For weight balancing purposes I prefer to place the arm 25 and its carried wheel 20 adjacent the right hand edge of the frame 5 in front of the motor.

Rigidly secured to the left side of the frame 5, as by welding, I provide a cradle member which, in its preferred form, comprises a plate 40 (Figs. 4 and 5). If preferred, the plate 40 can be formed as an integral part of the frame.

Plate 40 has an upwardly opening slot or recess 42 which is defined by a straight front side wall 43, a curved bottom wall 44 and an upwardly and rearwardly curved and inclining opposite rear side wall 45, so that the slot or cradle is somewhat upwardly flared.

A bearing sleeve 50 mounted in the slot has an enlarged diameter inner end portion 52 presenting peripheral flanges or abutments 53, these flanges being spaced apart longitudinally of the sleeve a distance equal to the thickness of the plate 40, so that when the sleeve is mounted in the slot the flanges abut opposite side surfaces of the plate about the curved bottom portion of the slot. The flanges 53 present flattened top portions 55.

A latch member is provided for holding the sleeve against rotation relative to plate 40, the latch comprising an arm 60 pivoted at one of its bifurcated ends as at 61 to the plate 40 and is releasably locked at its opposite bifurcated end by pin 62 inserted through registering openings 63 in the arm and plate. A set screw 70 is threaded through the arm 60 intermediate its ends and carries a winged lock nut 71. The bottom end of the set screw adjustably bears against the flattened portion 55 of the sleeve flanges so that the sleeve is held against rotation in the cradle. A driven shaft 80 is journalled in the bearing sleeve 50, roller bearings 81 and 82 for the shaft being mounted in the ends of the sleeve. A pulley 85 is secured on the inner end of the shaft 80 to receive a flexible drive belt 86 also extending about a pulley 87 on the motor or driving shaft 88, the two pulleys being in alignment for reception of the belt.

Figure 2:
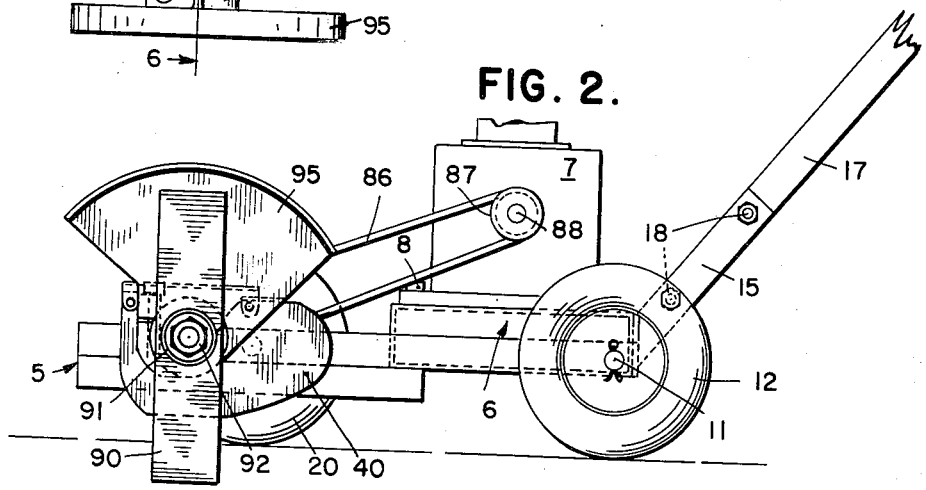
Fig. 2 is a side elevation.
Figure 3:
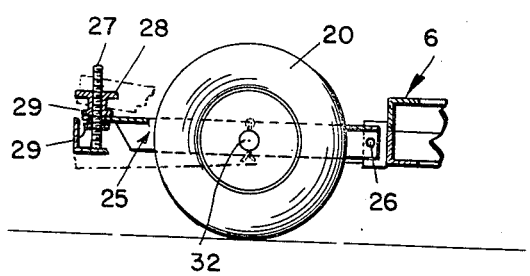
Fig. 3 is a section taken on line 3—3 of Fig. 1.

It will be apparent that various kinds of tools may be secured on the outer end of the shaft 80. For instance, as a typical example of such a tool, I show a lawn edging blade 90 secured on the shaft by conventional washers 91 and nut 92. Also various kinds of tool guards may be secured on the outer end of the sleeve, for example, in Figs. 1 and 2, I show a guard 95 for the described edging blade, the guard having a split clamping collar portion 96, clamped onto the sleeve by screw 97.

By way of further examples, other tools which may be mounted for operation by my device are such things as lawn mowers, sweeper brushes, cultivating implements, pumps, grinders, or flexible shafts may be operatively secured to the shaft 80 to operate various tools.

A significant feature of the illustrated and described shape of the slot 42 is that since the upwardly and rearwardly inclining curved wall or surface 45 is disposed toward the pulley 87, it enables the belt 86 to be initially mounted loosely on the pulleys before the bearing sleeve is dropped into the slot, and as the sleeve moves along the surface 45 to the bottom of the slot, the pulley 85 moves downwardly and further away from pulley 87, thus tightening the belt. Also, the defined shape of the slot provides a somewhat wedge fit of the sleeve therein.

While I have thus far described my unit in the form of a portable power unit, it will be apparent that it is useful also as a stationary unit such as on a home work bench. For instance, in Fig. 7 the numeral 100 denotes a work bench forming a base to which my plate 40a having the slot 42 is screwed, as by screws 101. The sleeve 50a, shaft 80a, and latch 60a are as before described. The inner end of shaft 80a carries a pulley (not shown) like pulley 85, in alignment with a pulley 87a on the shaft 88a of a motor 7a here shown as an electric motor.

I claim:

1. In a power unit for operating interchangeable tools, a base, a driving shaft rotatably carried by said base, a first pulley on said shaft, a bearing sleeve having a driven shaft journalled therein, a driven pulley secured on the inner end of said driven shaft, the outer end of said driven shaft being adapted to receive a tool, a continuous belt extending about said pulleys, means for retaining said bearing sleeve and its carried driven shaft in parallel relation to said driving shaft, said means comprising an upright plate carried by said base forwardly of said first pulley, said plate having an upwardly opening bearing sleeve receiving slot defined by a bottom wall, a front side wall and a rear side wall inclining rearwardly and upwardly towards said first pulley whereby to permit said bearing sleeve to be inserted in said slot when said belt is loosely disposed about said pulleys, and adjustable means for placing said belt in tension about said pulleys and for retaining said bearing sleeve in said slot, said last mentioned means comprising a holding member carried by said plate and operatively cooperating with said bearing sleeve to urge the latter first downwardly and forwardly along said rear wall and thence against said bottom wall.

2. In a power unit for operating interchangeable tools, a base, a driving shaft rotatably carried by said base, a first pulley on said shaft, a bearing sleeve having a driven shaft journalled therein, a driven pulley secured on the inner end of said driven shaft, the outer end of said driven shaft being adapted to receive a tool, a continuous belt extending about said pulleys, means for retaining said bearing sleeve and its carried driven shaft in parallel relation to said driving shaft, said means comprising an upright plate carried by said base forwardly on said first pulley, said plate having an upwardly opening bearing sleeve receiving slot defined by a bottom wall, a front side wall and a rear side wall inclining rearwardly and upwardly towards said first pulley whereby to permit said bearing sleeve to be inserted in said slot when said belt is loosely disposed about said pulleys, and means for placing said belt in tension about said pulleys and for retaining said bearing sleeve in said slot, said last mentioned means comprising an arm pivoted at one end to said plate at one side of said slot for swinging movement into and out of position overlying said slot, means for releasably locking the other end of said arm to said plate, and screw means threaded through said arm for engagement with the peripheral surface of said bearing sleeve.

References Cited in the file of this patent

UNITED STATES PATENTS

| | | |
|---|---|---|
| 860,092 | Hopkins | July 16, 1907 |
| 1,210,783 | Fay | Jan. 2, 1917 |
| 1,278,500 | Pereira et al. | Sept. 10, 1918 |
| 1,317,818 | Parker | Oct. 7, 1919 |
| 2,034,505 | Cline | Mar. 17, 1936 |
| 2,432,922 | Muzzy | Dec. 16, 1947 |
| 2,484,071 | Brauer | Oct. 11, 1949 |
| 2,520,488 | Batchelder | Aug. 29, 1950 |
| 2,585,859 | Showalter | Feb. 12, 1952 |
| 2,608,043 | Berdan | Aug. 26, 1952 |
| 2,630,747 | Mintz | Mar. 10, 1953 |
| 2,662,702 | Bruestle | Dec. 15, 1953 |